United States Patent
Zhang et al.

(10) Patent No.: US 10,481,921 B2
(45) Date of Patent: Nov. 19, 2019

(54) CLOUD PLATFORM, APPLICATION RUNNING METHOD, AND ACCESS NETWORK UNIT

(71) Applicant: Huawei Technologies Co., Ltd., Shenzhen, Guangdong (CN)

(72) Inventors: Sheng Zhang, Beijing (CN); Yihui Gui, Beijing (CN); Chao Rao, Beijing (CN); Chunchang Tian, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 86 days.

(21) Appl. No.: 15/716,816

(22) Filed: Sep. 27, 2017

(65) Prior Publication Data

US 2018/0018204 A1    Jan. 18, 2018

Related U.S. Application Data

(63) Continuation of application No. PCT/CN2015/075200, filed on Mar. 27, 2015.

(51) Int. Cl.
*G06F 9/445* (2018.01)
*H04W 88/08* (2009.01)
*G06F 9/455* (2018.01)
*G06F 9/48* (2006.01)
(Continued)

(52) U.S. Cl.
CPC ...... *G06F 9/44505* (2013.01); *G06F 9/45558* (2013.01); *G06F 9/485* (2013.01); *G06F 9/5077* (2013.01); *H04L 67/10* (2013.01); *H04L 67/34* (2013.01); *H04W 88/08* (2013.01); *G06F 2009/4557* (2013.01); *G06F 2009/45562* (2013.01); *G06F 2009/45575* (2013.01)

(58) Field of Classification Search
CPC ............ G06F 9/44505; G06F 9/45558; G06F 9/4856; G06F 9/5088
See application file for complete search history.

(56) References Cited

U.S. PATENT DOCUMENTS 8,261,295 B1 *  9/2012  Risbood .............. G06F 9/44505
                                                                719/328
2010/0188990 A1   7/2010  Raleign
(Continued)

FOREIGN PATENT DOCUMENTS

| CN | 101969391 A | 2/2011 |
| CN | 102365630 A | 2/2012 |
| CN | 102968860 A | 3/2013 |

(Continued)

*Primary Examiner* — Kyung H Shin
(74) *Attorney, Agent, or Firm* — Womble Bond Dickinson (US) LLP

(57) ABSTRACT

Embodiments of the present disclosure disclose a cloud platform, including: an Internet unit, configured to distribute an application and a lite server that are developed by an application service provider to a core network unit; the core network unit, configured to distribute the application and the lite server to an access network unit, wherein the access network unit is configured to virtualize a terminal and migrate a computing task of the terminal to virtual user equipment in a virtual machine for execution, and virtualize the lite server and migrate a network service capability of the lite server to the access network unit, so that the virtual user equipment runs the application distributed by the core network unit.

15 Claims, 18 Drawing Sheets

(51) Int. Cl.
 G06F 9/50 (2006.01)
 H04L 29/08 (2006.01)

(56) References Cited

U.S. PATENT DOCUMENTS

2013/0117769 A1    5/2013   Sharma et al.
2015/0040127 A1*   2/2015   Dippenaar ............ G06F 9/4856
                                                  718/1

FOREIGN PATENT DOCUMENTS

CN    103365702 A    10/2013
CN    103746886 A     4/2014
CN    103746925 A     4/2014

* cited by examiner

CLOUD PLATFORM, APPLICATION RUNNING METHOD, AND ACCESS NETWORK UNIT

CROSS-REFERENCE TO RELATED APPLICATIONS

This application is a continuation of International Application No. PCT/CN2015/075200, filed on Mar. 27, 2015, the disclosure of which is hereby incorporated by reference in its entirety.

TECHNICAL FIELD

The present application relates to the field of communications technologies, and in particular, to a cloud platform, an application running method, and an access network unit.

BACKGROUND

With rapid development of communications technologies and Internet technologies, cloud services are gradually applied to people's lives and work, and can provide, through the Internet, an easily-extensible, dynamical, and virtualized resource to a user for use. According to a core idea of the cloud service, a large quantity of computing resources connected by using a network are managed and scheduled together, to form a computing resource pool for providing a service to a user on demand. A network that provides resources is referred to as "cloud". In the view of a user, the resource in the "cloud" can be infinitely extended, and can be obtained at any time, used on demand, extended at any time, and paid according to usage. A core thereof is a virtualization technology. According to virtualization and different levels of services that are provided, the cloud services are mainly classified into a software-as-a-service (SaaS), a platform-as-a-service (PaaS), and an infrastructure-as-a-service (IaaS). The SaaS is a mode in which software is provided through a network and a user rents web-based software from a provider to manage business activities of an enterprise without purchasing software. Most emerging Internet services represented by an over the top (OTT) service mostly serve the user in an SaaS model. In this case, an operator becomes a simple transmission pipeline and cannot gain any profit. The PaaS actually means that a software development platform is used as a service to be provided to the user in an SaaS mode. Therefore, the PaaS is also an application of the SaaS mode. A PaaS service model is soul of a current cloud computing industry, and a running environment and a platform capability are used as a service for delivery. A developer hosts an application on the platform, and then the platform provides a service to a user. Such service model between the user and the developer is most suitable for the operator. In an IaaS service model, underlying hardware resources are used as a service for delivery after being packaged, and service objects thereof are an application developer and a small quantity of advanced users. A delivery model of such service has strong versatility and flexibility. However, a quantity of users is relatively small and a unit price is relatively high. For operators, the delivery model of such service is lack of attractiveness, and has quite limited profit margins.

Internet application service providers (ASPs) are developing cloud computing products of the PaaS model with great effort. Several major operators are also quite active in launching their own "cloud" products, but the "cloud" products have relatively primary functions and bring ordinary experience. Most of these cloud products remain at a stage of an SaaS model. An IaaS model has been tried on a small scale. However, the several major operators cannot compete with the ASPs either in function integrity or a quantity of users of the cloud products. In addition, for the operators, due to a weak basis and high costs of cloud product development, hardware configurations provided by the operators are relatively low and product prices are relatively high.

SUMMARY

Embodiments of the present disclosure provide a cloud platform, an application running method, and an access network unit, so as to resolve a problem that an existing cloud product of an operator has high development costs, poor user experience, and limited promotion means.

To resolve the foregoing technical problem, a first aspect of the embodiments of the present disclosure provides a cloud platform, including:

an Internet unit, configured to distribute an application and a lite server that are developed by an application service provider to a core network unit;

the core network unit, configured to distribute the application and the lite server to an access network unit; and the access network unit, configured to virtualize a terminal, and migrate a computing task of the terminal to virtual user equipment in a virtual machine for execution; and virtualize the lite server, and migrate a network service capability of the lite server to the access network unit, so that the virtual user equipment runs the application distributed by the core network unit.

In a first possible implementation of the first aspect, the Internet unit is further configured to send capability requirement information of a developer to the core network unit; and the core network unit is further configured to perform capability extraction and encapsulation on a network element corresponding to the capability requirement information, for calling by the application.

In a second possible implementation of the first aspect, the Internet unit is further configured to receive capability requirement information of a developer, develop a capability of the Internet unit, and store a new capability in an application programming interface set of the Internet unit, for local or remote calling by the application.

In a third possible implementation of the first aspect, the core network unit is further configured to remotely control a capability engine in the access network unit according to an instruction of an administrator, add or modify software and hardware capabilities of the access network unit, and add an application programming interface of the access network unit, for calling by the virtual user equipment or the lite server.

In a fourth possible implementation of the first aspect, the Internet unit is further configured to test and deploy a developed application and application server.

With reference to the fourth possible implementation of the first aspect, in a fifth possible implementation, the Internet unit is further configured to distribute the developed application program to the core network unit;

the core network unit is further configured to distribute the lite server corresponding to the application to the access network unit; and the access network unit is further configured to deploy the lite server in a local virtualized environment to provide a service to the virtual user equipment.

With reference to the fourth possible implementation of the first aspect, in a sixth possible implementation, the core network unit is further configured to receive a distribution instruction sent by an administrator, and distribute an installation package of the application to a virtualized environment of the access network unit; and the access network unit is further configured to install the application to the virtual user equipment.

With reference to the fifth or sixth possible implementation of the first aspect, in a seventh possible implementation, if the lite server located in the access network unit has a capability of serving the virtual user equipment, when a user uses the terminal, the access network unit is configured to: connect the terminal to the virtual user equipment, send a request to the lite server according to a requirement of the terminal, and call, by using a local capability, a local application programming interface to provide a service; or communicate with the core network unit, and call a capability in a capability pool of the core network unit to serve the lite server to meet the requirement of the terminal; or if the lite server located in the access network unit does not have a capability of serving the virtual user equipment, the access network unit is configured to send a request to a virtual machine server in the Internet unit by using the core network unit, and receive a service result by using the lite server to meet a requirement of the terminal, where the service result is returned by the virtual machine server after the virtual machine server calls a capability application programming interface of the Internet unit.

In an eighth possible implementation of the first aspect, the core network unit is further configured to virtualize the terminal and the lite server.

A second aspect of the embodiments of the present disclosure provides a application running method, including:

receiving an application and a lite server that are distributed by a core network unit, where the application and the lite server are developed by an Internet unit and distributed by the Internet unit to the core network unit; and virtualizing a terminal, and migrating a computing task of the terminal to virtual user equipment in a virtual machine for execution; and virtualizing the lite server, and migrating a network service capability of the lite server to an access network unit, so that the virtual user equipment runs the application distributed by the core network unit.

In a first possible implementation of the second aspect, if the lite server located in the access network unit has a capability of serving the virtual user equipment, when a user uses the terminal, the access network unit connects the terminal to the virtual user equipment, sends a request to the lite server according to a requirement of the terminal, and calls, by using a local capability, a local application programming interface to provide a service; or communicates with the core network unit, and calls a capability in a capability pool of the core network unit to serve the lite server to meet the requirement of the terminal; or if the lite server located in the access network unit does not have a capability of serving the virtual user equipment, the access network unit sends a request to a virtual machine server in the Internet unit by using the core network unit, and receives a service result by using the lite server to meet a requirement of the terminal, where the service result is returned by the virtual machine server after the virtual machine server calls a capability application programming interface of the Internet unit.

A third aspect of the embodiments of the present disclosure provides an access network unit, including:

a receiving module, configured to receive an application and a lite server that are distributed by a core network unit, where the application and the lite server are developed by an Internet unit and distributed by the Internet unit to the core network unit; and a virtualization module, configured to virtualize a terminal, and migrate a computing task of the terminal to virtual user equipment in a virtual machine for execution; and virtualize the lite server, and migrate a network service capability of the lite server to the access network unit, so that the virtual user equipment runs the application distributed by the core network unit.

In a first possible implementation of the third aspect, including:

if the lite server located in the access network unit has a capability of serving the virtual user equipment, when a user uses the terminal, the virtualization module is further configured to connect the terminal to the virtual user equipment, send a request to the lite server according to a requirement of the terminal, and call, by using a local capability, a local application programming interface to provide a service; or communicate with the core network unit, and call a capability in a capability pool of the core network unit to serve the lite server to meet a requirement of the terminal; or if the lite server located in the access network unit does not have a capability of serving the virtual user equipment, the virtualization module is further configured to send a request to a virtual machine server in the Internet unit by using the core network unit, and receive a service result by using the lite server to meet a requirement of the terminal, where the service result is returned by the virtual machine server after the virtual machine server calls a capability application programming interface of the Internet unit.

A fourth aspect of the embodiments of the present disclosure provides an access network unit, including:

an input device, an output device, a memory, and a processor, where the input device, the output device, the memory, and the processor are connected to a bus, the memory stores a set of program code, and the processor is configured to call the program code stored in the memory to execute the following operations:

receiving an application and a lite server that are distributed by a core network unit, where the application and the lite server are developed by an Internet unit and distributed by the Internet unit to the core network unit; and virtualizing a terminal, and migrating a computing task of the terminal to virtual user equipment in a virtual machine for execution; and virtualizing the lite server, and migrating a network service capability of the lite server to the access network unit, so that the virtual user equipment runs the application distributed by the core network unit.

In a first possible implementation of the fourth aspect, if the lite server located in the access network unit has a capability of serving the virtual user equipment, when a user uses the terminal, connecting, by the access network unit, the terminal to the virtual user equipment; sending a request to the lite server according to a requirement of the terminal, and calling, by using a local capability, a local application programming interface to provide a service; or communicating with the core network unit, and calling a capability in a capability pool of the core network unit to serve the lite server to meet the requirement of the terminal; or if the lite server located in the access network unit does not have a capability of serving the virtual user equipment, the processor is further configured to send a request to a virtual machine server in the Internet unit by using the core network unit, and receive a service result by using the lite server to meet a requirement of the terminal, where the service result is returned by the virtual machine server after the virtual machine server calls a capability application programming interface of the Internet unit.

The following beneficial effects are achieved by implementing the embodiments of the present disclosure:

A mobile virtualization technology is configured for an access network unit, so that the access network unit can provide VUE and a lite server to maximize use of a network capability of an operator, making an ASP provide a user with a higher quality service while avoiding bringing unnecessary burden to a network of the operator. In addition, cloud product development costs of the operator can be reduced, user experience can be improved, a service promotion effect of the operator can be enhanced. A capability engine on the access network unit provides a telecommunications capability that the access network unit has to an application program on a platform, and uses a location characteristic of a network edge to reduce a round-trip time and core network traffic, so as to maximize use of a locating capability and increase profit margins.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
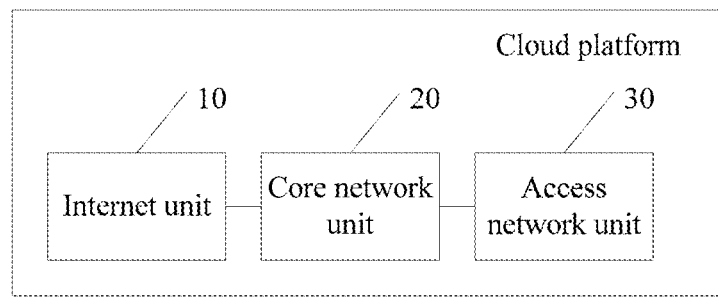
FIG. 1 is a schematic composition diagram of a cloud platform according to an embodiment of the present disclosure.

Referring to FIG. 1, FIG. 1 is a schematic composition diagram of a cloud platform according to an embodiment of the present disclosure. In this embodiment, the cloud platform includes:

an Internet unit 10, configured to distribute an application and a lite server that are developed by an application service provider to a core network unit 20;

the core network unit 20, configured to distribute the application and the lite server to an access network unit 30; and the access network unit 30, configured to virtualize a terminal, and migrate a computing task of the terminal to virtual user equipment in a virtual machine for execution; and virtualize the lite server, and migrate a network service capability of the lite server to the access network unit, so that the virtual user equipment runs the application distributed by the core network unit.

During capability development, optionally, the Internet unit 10 is further configured to send capability requirement information of a developer to the core network unit 20.

The core network unit 20 is further configured to perform capability extraction and encapsulation on a network element corresponding to the capability requirement information, for calling by the application.

Alternatively, the Internet unit 10 is further configured to receive capability requirement information of a developer, develop a capability of the Internet unit 10, and store a new capability in an application programming interface set of the Internet unit 10, for local or remote calling by the application.

Alternatively, the core network unit 20 is further configured to remotely control a capability engine in the access network unit 30 according to an instruction of an administrator, add or modify software and hardware capabilities of the access network unit 30, and add an application programming interface of the access network unit 30, for calling by the virtual user equipment or the lite server.

During application development, the Internet unit 10 is further configured to test and deploy a developed application and application server.

After the application and the application server are developed, the Internet unit 10 may distribute the application.

Optionally, the Internet unit 10 is further configured to distribute the developed application program to the core network unit 20.

The core network unit 20 is further configured to distribute the lite server corresponding to the application to the access network unit 30.

The access network unit 30 is further configured to deploy the lite server in a local virtualized environment to provide a service to the virtual user equipment.

Alternatively, the core network unit 20 is further configured to receive a distribution instruction sent by an administrator, and distribute an installation package of the application to a virtualized environment of the access network unit 30.

The access network unit 30 is further configured to install the application to the virtual user equipment.

When a user uses the terminal, the terminal may be served according to a capability of the lite server on the access network unit 30.

If the lite server located in the access network unit 30 has a capability of serving the virtual user equipment, when a user uses the terminal, the access network unit 30 is configured to: connect the terminal to the virtual user equipment, send a request to the lite server according to a requirement of the terminal, and call, by using a local capability, a local application programming interface to provide a service; or communicate with the core network unit 20, and call a capability in a capability pool of the core network unit 20 to serve the lite server to meet the requirement of the terminal.

If the lite server located in the access network unit 30 does not have a capability of serving the virtual user equipment, the access network unit 30 is configured to send a request to a virtual machine server in the Internet unit 10 by using the core network unit, and receive a service result by using the lite server to meet a requirement of the terminal, where the service result is returned by the virtual machine server after the virtual machine server calls a capability application programming interface of the Internet unit 10.

Optionally, a capability of the virtualized environment may also be built in the core network unit 20, that is, the core network unit 20 is further configured to virtualize the terminal and the lite server.

A conventional platform is compared with the cloud platform in this embodiment of the present disclosure in the following.

Capabilities of an open conventional platform are as follows:

hardware capabilities: the hardware capabilities are provided by a server in the Internet, and include a computing capability, a storage capability, and the like;

location capability: an APP itself obtains a rough location of UE, and consumes a large amount of power when being in an enabled state for a long time;

air interface capability: a channel is only occupied passively;

user information capability: only registration information and an operation log of a user on the website can be obtained; and capability customizability: the conventional platform has only an Internet capability, and has great limitations and poor customizability.

Capabilities of the cloud platform in this application are as follows:

hardware capabilities: the hardware capabilities are provided by an IaaS at a bottom layer of an access network unit, include a computing capability, a storage capability, and the like, and are widely distributed and quite close to a user;

location capability: the access network unit can accurately locate a user, and is more practical and energy-saving;

air interface capability: an operator provides a higher quality air interface service by charging fees, such as a dedicated push channel and a fast transmission channel, and the like, and there are a large quantity of available underlying capabilities to be developed;

user information capability: an operator uses information that does not involve personal privacy of a user, such as monthly spending ability and a personalized feature, as a capability for use by an ASP, so as to facilitate accurate advertisement delivery;

capability customizability: an aggregation platform has rich telecommunications capabilities, and can perform in-depth customization according to requirements of different customers; and provides one-click installation of an APP to terminals of all users:

advertisement pushing: a latest APP is pushed in forms of a multimedia message, a notification bar, a banner advertisement, and the like;

a contract terminal: a cheap terminal is provided when a user buys the cell phone, and the user agrees, in a contract form, to regularly accept APP pushing;

paid APP: a user exchanges for traffic, points, gifts, and the like by accepting installation of an APP; and the following personalized recommendations are provided to make a user obtain a most needed APP most conveniently:

using a network-wide data collection capability of the aggregation platform to analyze a behavior and a habit of a user, so as to provide a most accurate APP personalized recommendation; and APP trial: public VUE pre-installed with a to-be-promoted APP is provided, and a user can switch to the VUE, and choose to install the APP after a free trial, avoiding a problem that the user is unwilling to install the APP due to unfamiliarity with the APP or much trouble in installing the APP.

Therefore, by using the cloud platform in this embodiment of the present disclosure, many existing contradictions between an operator, an ASP, and a user are resolved, and win-win therebetween is achieved.

An operator occupies a more favorable position in a mobile Internet war situation. This reduces a price to pay for the OTT challenge, and gets completely rid of a "pipeline" role. In addition, the operator can also use the cloud platform in this embodiment to obtain a new profit mode.

The cloud platform implements real cloud storage, and different devices of a user share same application data and personal data. This ensures information security.

A capability constraint of a mobile device is broke through, and hardware is simply and fast extended according to a requirement. This is in line with an idea of mobile cloud computing, and adapts to a requirement of a next-generation network. A localized service platform provides a basic platform for mobile Internet segmentation service innovation.

In conclusion, an existing hardware device is extended by using network element facilities widely used in a telecommunications network. In this way, platform development and maintenance costs can be reduced, so that a product price is reduced, and a high quality service is provided; a telecommunications capability that cannot be directly obtained by an ASP can be provided to increase industrial competitiveness; a requirement of an upcoming era of the Internet of Things can be adapted to comprehensively, and a new idea is provided for energy saving and cost reducing of a networking device; an OTT developer changes into a customer of an operator from a competitor of the operator, and creates a new business mode; a brand effect can be used to make use of a characteristic that the operator is trusted by customers, so as to provide a more stable and secure service. This provides a perfect solution for resolving two issues "channel" and "user" in an APP promotion process.

Figure 2:
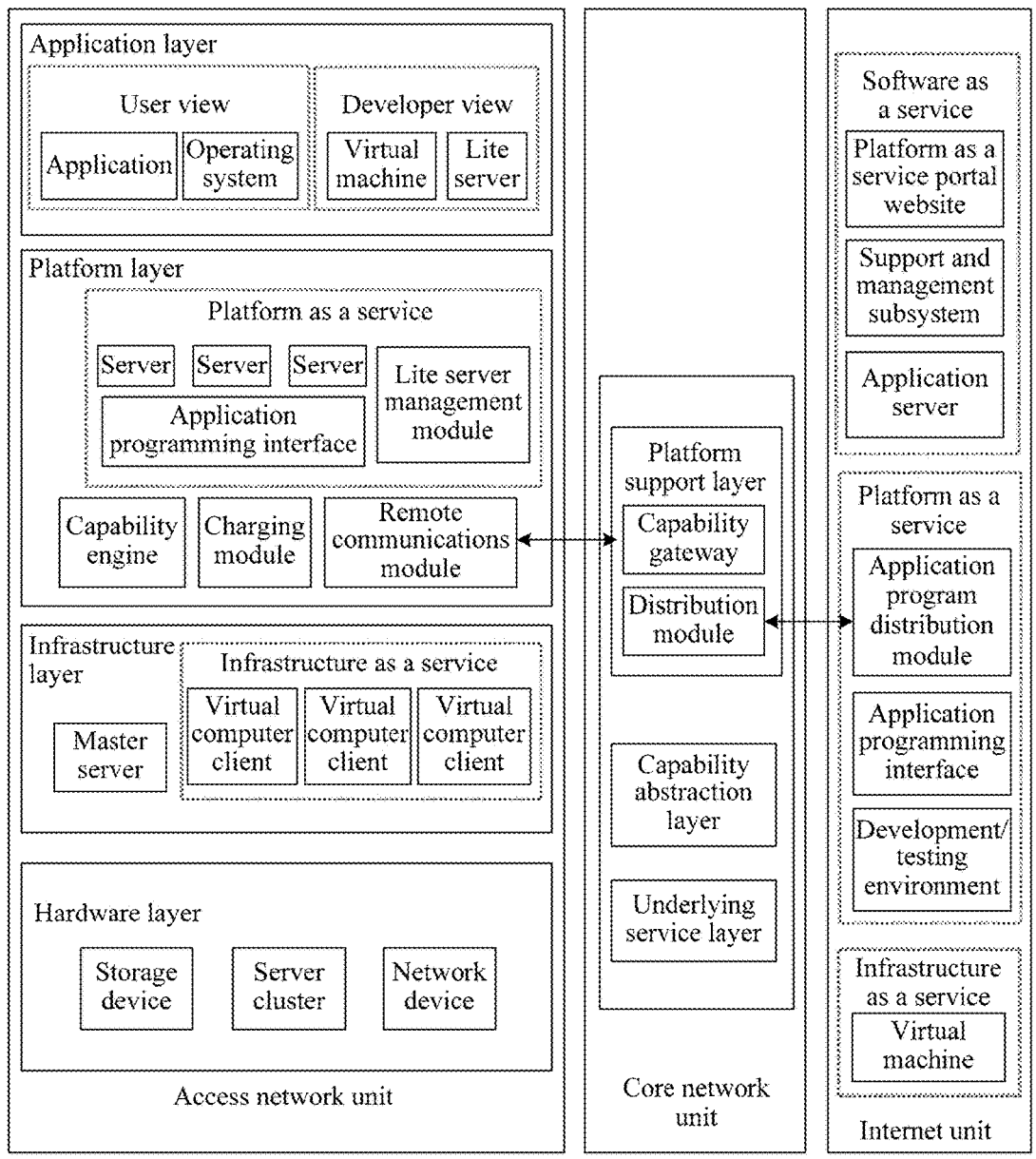
FIG. 2 is a schematic diagram of a first specific architecture of the cloud platform shown in FIG. 1.

Referring to FIG. 2, FIG. 2 is a schematic diagram of a first specific architecture of the cloud platform shown in FIG. 1. In this embodiment, the cloud platform includes:

an Internet unit, a core network unit, and an access network unit. The access network unit may be disposed in a base station.

The access network unit is a core unit that achieves many beneficial effects of the cloud platform. The Internet unit is an entrance at which an administrator and an ASP directly interact with the platform. The core network unit is located between the access network unit and the Internet unit, and plays a role of intermediary and implements more comprehensive function support. The following describes the cloud platform in this embodiment in detail with reference to FIG. 3 to FIG. 8.

Figure 3:
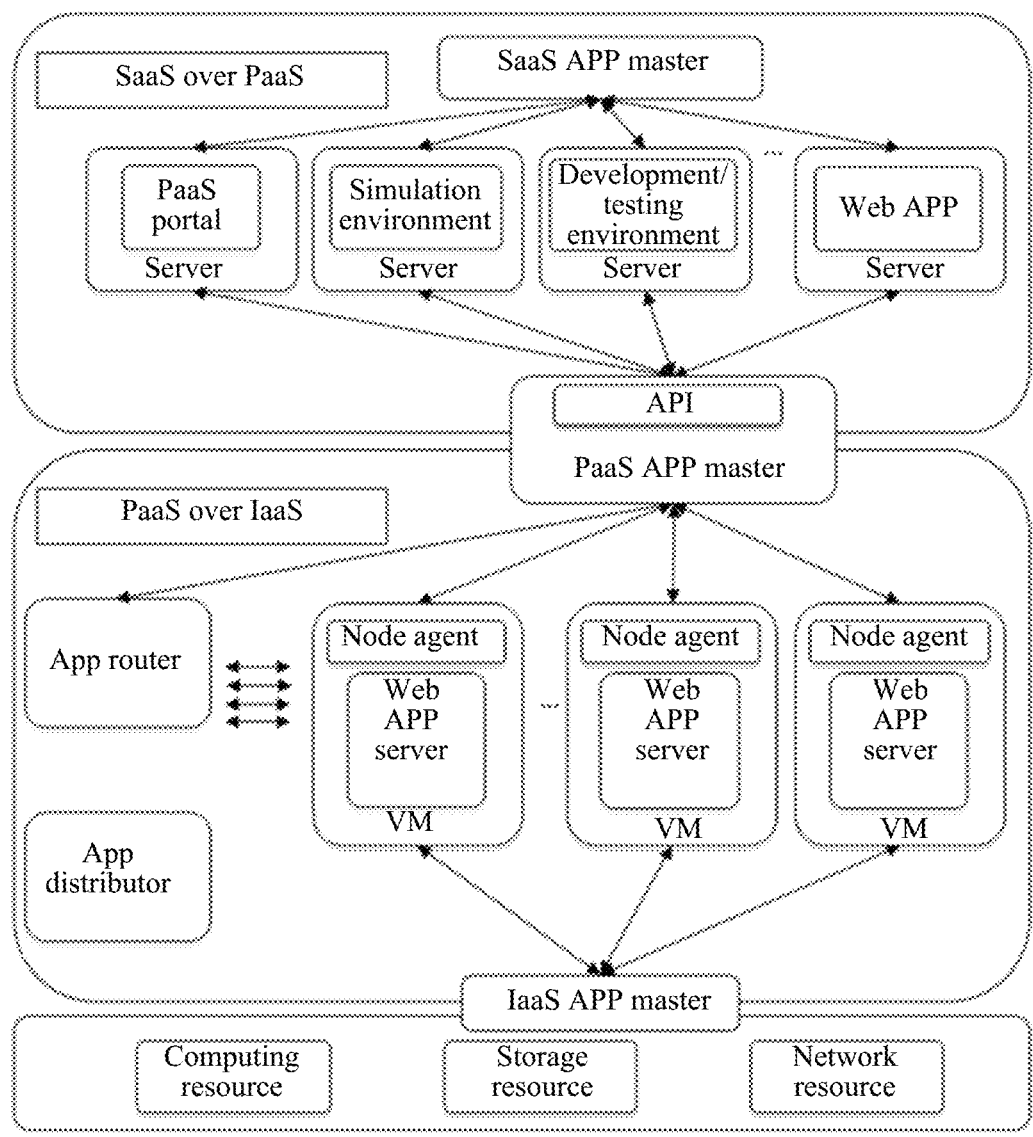
FIG. 3 is a schematic diagram of a specific architecture of an Internet unit of the cloud platform shown in FIG. 2.

Referring to FIG. 3, FIG. 3 is a schematic diagram of a specific architecture of an Internet unit in the cloud platform shown in FIG. 2. In this embodiment, the cloud platform is a standard "cloud computing" application program on an Internet side. The cloud platform includes, from top to bottom, three layers of logical structures: an SaaS, a PaaS, and an IaaS.

The SaaS at the top includes a support and management system of the platform itself, and provides all use functions of the platform according to an administrator view and a user view at a front end.

The SaaS is built on the PaaS, both a sub-application of the system itself and a web application of a user are used as a network application (Web APP) for processing.

The PaaS in the middle includes a complete development environment, testing environment, and network simulation environment, and a required API. After development and testing are ended, distribution is performed by using an application distributor (App Distributor) module, to publish a lite server (Lite Server) in an access network unit.

The IaaS at the bottom provides a service to the PaaS at the top layer.

Figure 4:
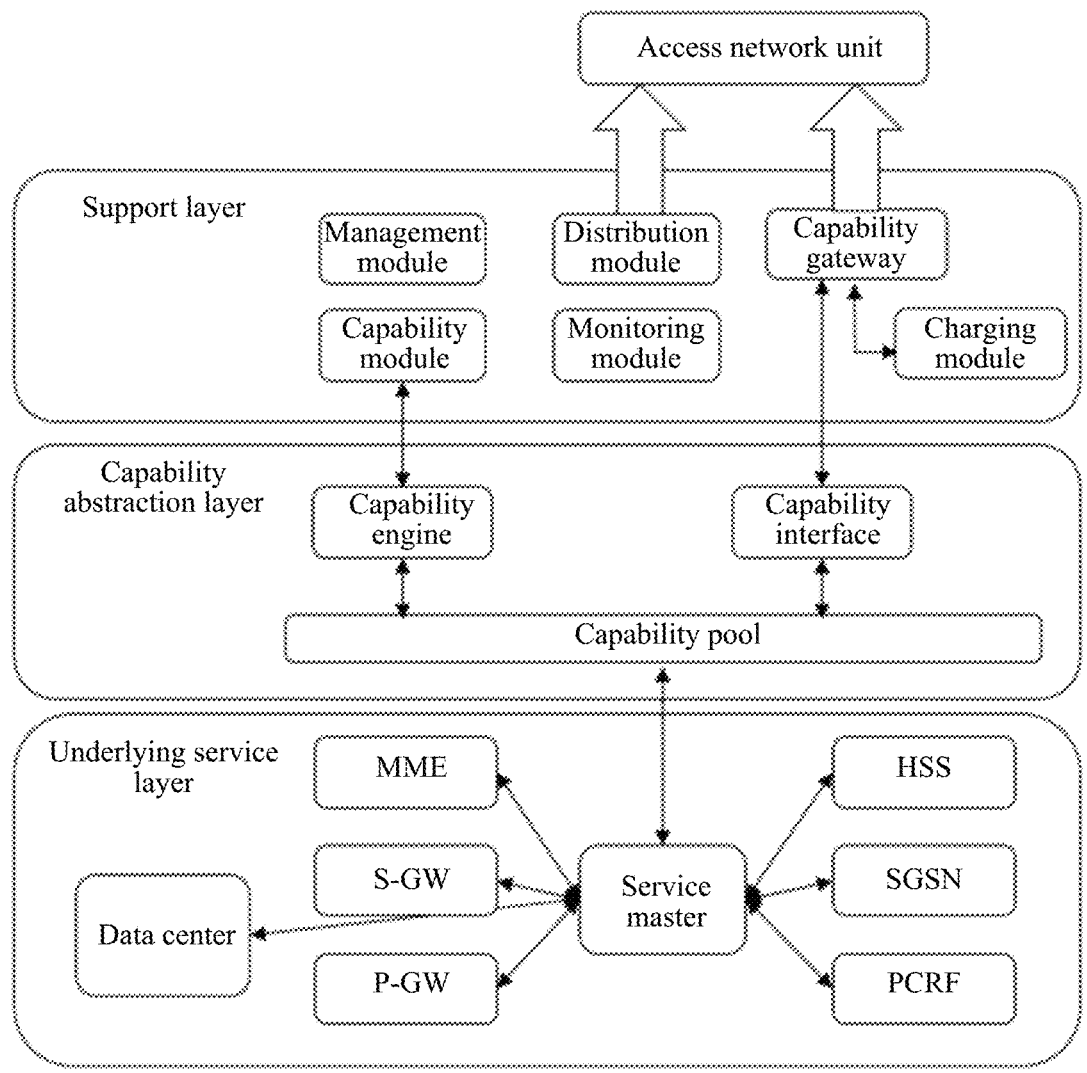
FIG. 4 is a schematic diagram of a specific architecture of a core network unit of the cloud platform shown in FIG. 2.

Referring to FIG. 4, FIG. 4 is a schematic diagram of a specific architecture of a core network unit in the cloud platform shown in FIG. 2. In this embodiment, the core network unit is divided, from top to bottom, into three logical layers: a support layer, a capability abstraction layer, and a service layer.

The support layer at the top includes two parts: In a first part, a management module is responsible for managing the unit, including: an administrator maintains all functions of the module; a capability module provides all functions related to a capability and interacts with an underlying capability engine; a monitoring module is configured to monitor working statuses of all modules at layers in real time; and a distribution module is responsible for distributing a lite server to an access network unit.

In a second part, a gateway and a charging module that are at the layer and that communicate with the access network unit are provided.

The capability layer in the middle includes a capability pool, a capability engine for adding, deleting, modifying, and checking the capability layer, and a capability interface provided for calling by an application.

The service layer at the bottom abstracts multiple network elements, extracts different services and capabilities by using a service master module, encapsulates the different services and capabilities, and puts encapsulated services and capabilities into the capability pool. A data center is represented as a data-related capability externally.

Figure 5:
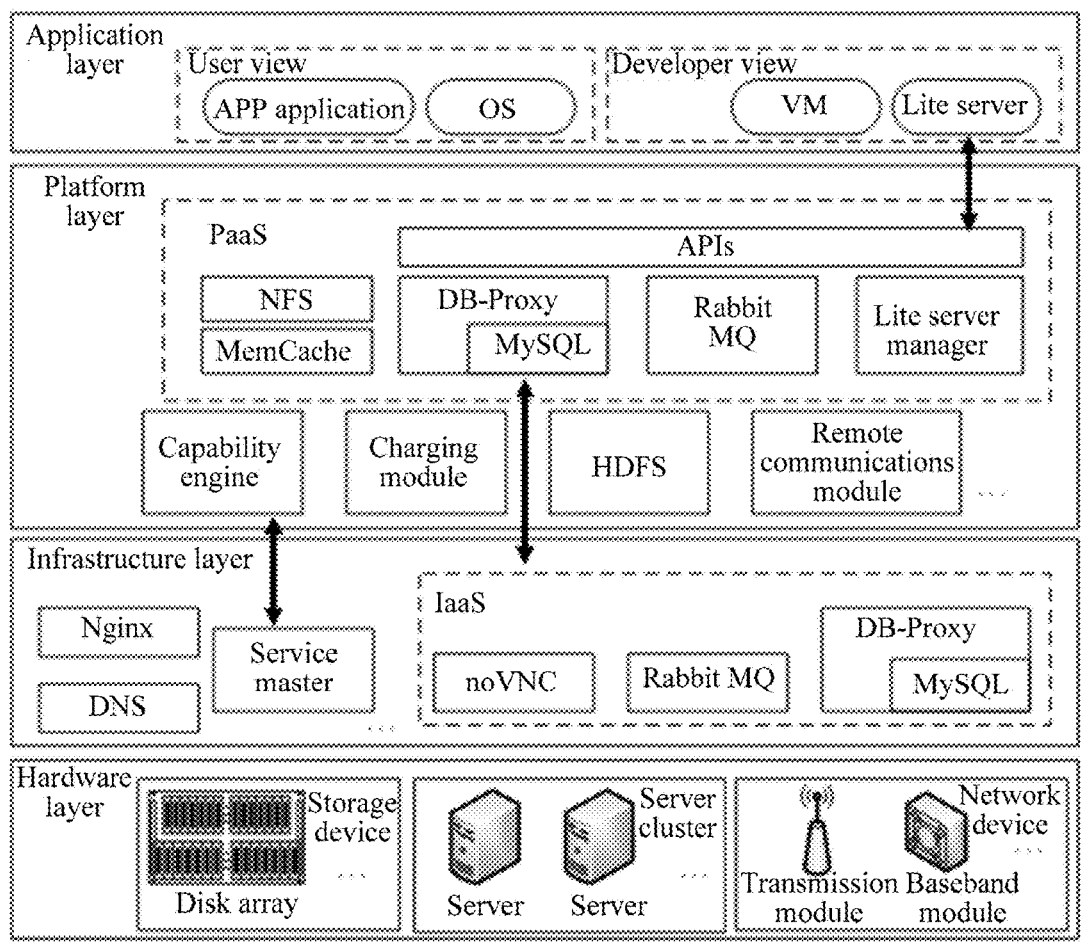
FIG. 5 is a schematic diagram of a specific architecture of an access network unit of the cloud platform shown in FIG. 2.

Referring to FIG. 5, FIG. 5 is a schematic diagram of a specific architecture of an access network unit in the cloud platform shown in FIG. 2. In this embodiment, the access network unit is divided, from top to bottom, into four logical layers: an application layer, a platform layer, an infrastructure layer, and a hardware layer.

The application layer at the top includes two views. A user view is presented directly to an end user and a service is provided by an MaaIO service model in mobile virtualization. A developer view is presented facing a developer of an APP, where a lite server is supported by the platform layer.

The platform layer includes a full set of PaaS platform and a submodule that provides support to the platform. A capability engine encapsulates, according to a requirement, different capabilities and services into an API for calling by an upper layer. A remote communications module interacts with a distribution module and a capability gateway in a core network unit, completes a deployment task of the lite server together with a lite server manager module, and calls a capability of a core network.

The infrastructure layer includes an IaaS platform that provides a service to a PaaS platform and a submodule that provides support to the platform. The service master module extracts and encapsulates various hardware and network capabilities at the bottom layer, and provides the hardware and network capabilities to the upper-layer capability engine for management.

The hardware layer at the bottom includes an original network device in the access network unit and a newly added universal server cluster and storage device, and provides comprehensive hardware support to the upper layer.

Figure 6:
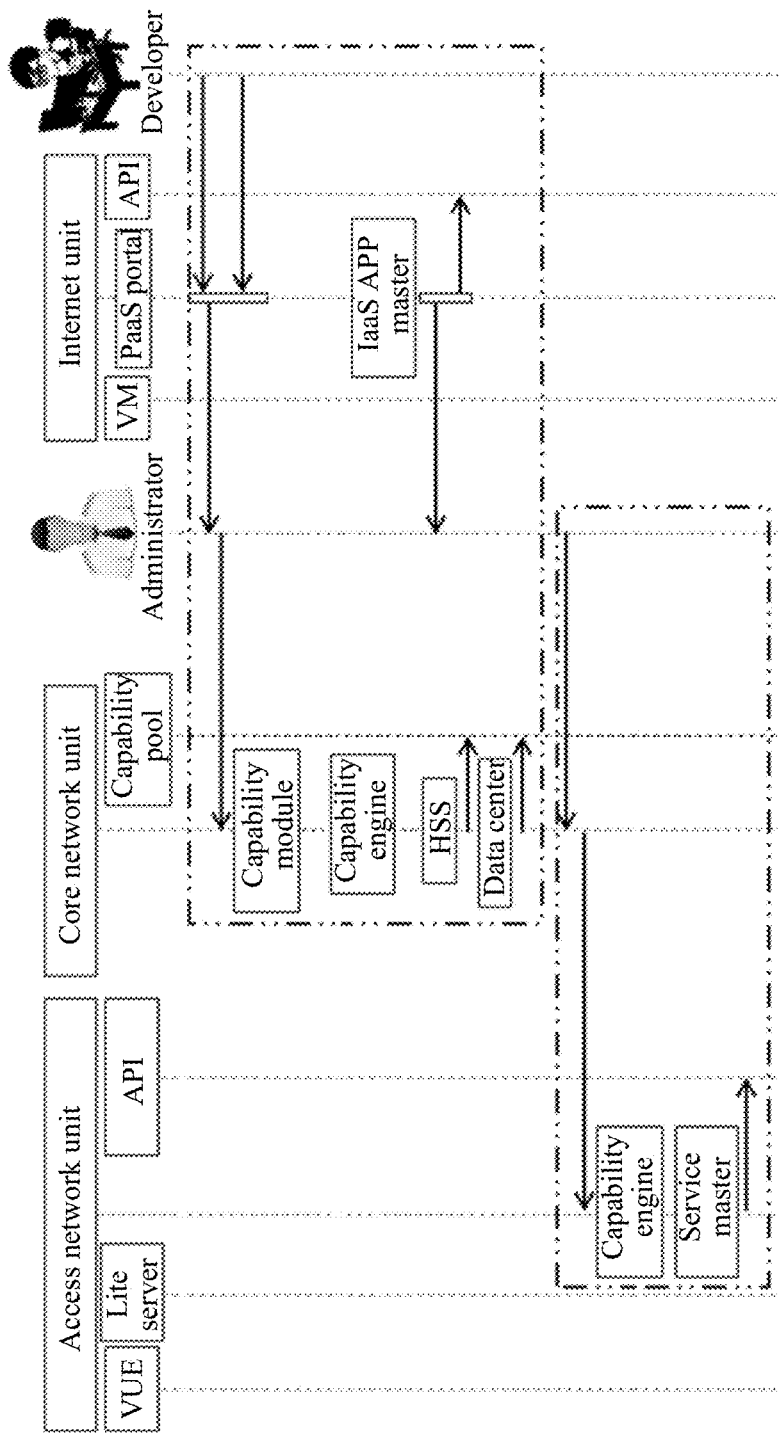
FIG. 6 is a temporal logic diagram of a capability development stage of the cloud platform shown in FIG. 2.

Referring to FIG. 6, FIG. 6 is a temporal logic diagram of a capability development stage of the cloud platform shown in FIG. 2. In this embodiment, an application service can use a telecommunications network capability by using an aggregated cloud platform across a telecommunications network and the Internet. Therefore, capability development is an important stage of the present disclosure.

There are two processes in the capability development stage. First, a developer proactively initiates the capability development.

Process 1: The developer performs an operation on a PaaS portal of an Internet unit to initiate the process;

after receiving, on the PaaS portal, a new capability requirement put forward by the developer, an administrator uses an administrator permission to operate a capability module of a core network unit;

the capability module calls an underlying capability engine, and the capability engine performs capability extraction and encapsulation on a network element such as a home subscriber server (HSS), and put an encapsulated capability into a capability pool for calling by an upper-layer application;

The developer may also develop an Internet capability in addition to putting forward a capability requirement to the administrator. After the development is completed, an application is made to the administrator by using an IaaS App master module; and after a review on the application by the administrator is passed, a new capability is added to an API set of the Internet unit by using the module, for local or remote calling by the application program.

Process 2: The administrator proactively initiates a capability development process, which is applicable to development and management of a capability in an access network unit.

The administrator uses a capability module in the core network unit to remotely control a capability engine of the access network unit; and after underlying software and hardware capabilities of the access network unit are added or modified, the added or modified underlying software and hardware capabilities are added in an API set for calling by local virtual user equipment (VUE) or a lite server.

Figure 7:
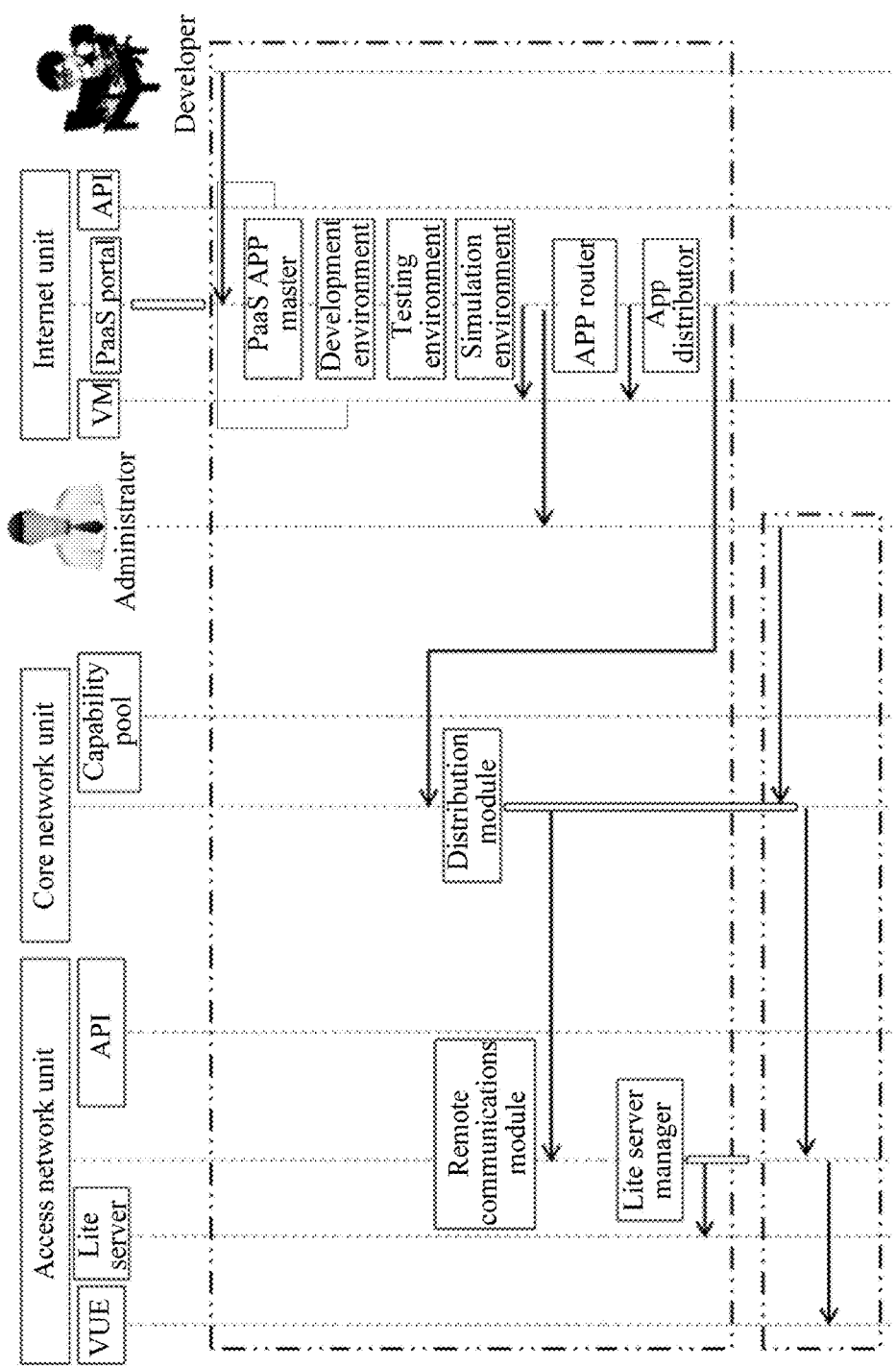
FIG. 7 is a temporal logic diagram of application program development/deployment of the cloud platform shown in FIG. 2.

Referring to FIG. 7, FIG. 7 is a temporal logic diagram of application program development/deployment of the cloud platform shown in FIG. 2. In this embodiment, the cloud platform further uses a cloud computing service model of a PaaS essentially. As an excellent PaaS platform, it is required to provide an application program development and deployment environment.

There are two processes at this stage. First, a developer proactively initiates APP development and deployment.

Process 1: The developer performs an operation on a PaaS portal of the Internet to initiate the process;

the developer develops an APP in an online development environment in cooperation with a PaaS App master module;

a complete test is performed, by using a standard sandbox, in a testing environment after the development is completed;

a simulation environment may be used in cooperation with the testing environment, or may be used alone, to provide the developer with an online simulation environment for various different hardware configurations and software environments, so that the developer can simulate a deployed scenario locally without deploying an APP or an APP server formally;

a virtual machine is used in an Internet unit in cooperation with the PaaS App master in the development, testing, and simulation environments;

after the developer completes final development of the APP and the APP server and after a review on the APP and the APP server by an administrator is passed, the APP server and a lite server are deployed separately;

the APP server is deployed in the virtual machine (VM) of the Internet unit by using an APP router, to be connected to the APP and provide a service to the APP;

remote distribution is performed by using an APP distributor, and an APP installation package is sent to a distribution module of a core network unit;

the distribution module establishes a connection to a remote communications module of an access network unit, to send the lite server to one or more access network units; and in cooperation with a lite server manager module, a corresponding lite server is deployed in a local virtualized environment of the access network unit and a short-distance service is provided to VUE.

Process 2: A process in which APP deployment is initiated by the administrator proactively is applicable to a related scenario in which an operator promotes an APP.

The administrator directly distributes an APP installation package to a virtualized environment in some access network units by using the distribution module in the core network unit; and the access network unit installs an APP to designated VUE.

The distribution module may deploy a lite server in the access network unit, or may directly deploy an APP to the VUE, and distribute value-added content such as an advertisement.

Figure 8:
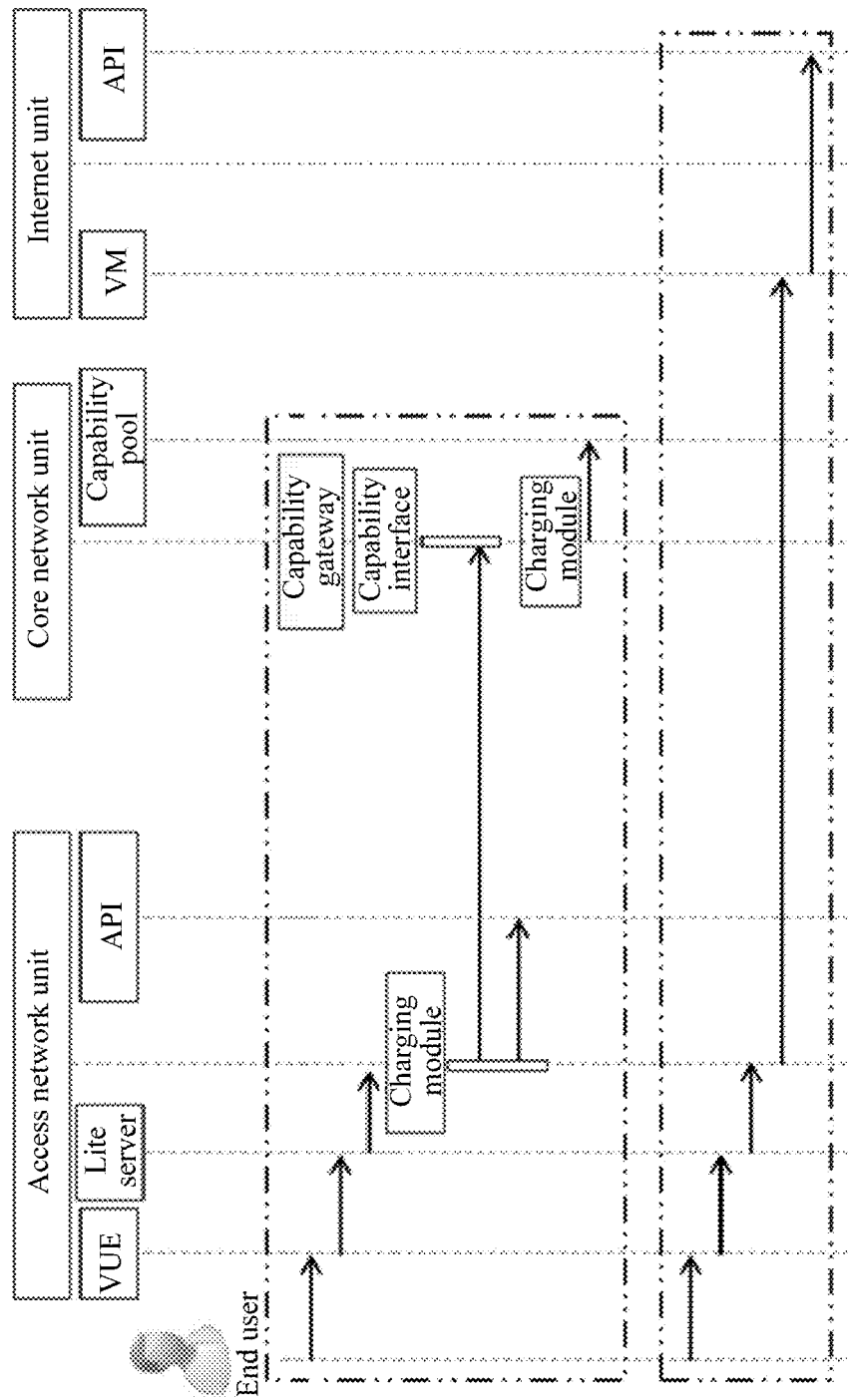
FIG. 8 is a temporal logic diagram for use of the cloud platform shown in FIG. 2.

Referring to FIG. 8, FIG. 8 is a temporal logic diagram for use of the cloud platform shown in FIG. 2. In this embodiment, a use stage includes two processes.

Process 1: A local lite server of an access network unit is capable of providing a service to VUE. First, a user uses UE, and the UE establishes a connection to the VUE in the access network unit. The VUE sends a request to the lite server as needed. In this case, the lite server may call a local API or may use a capability in a core network. If the lite server calls a local API, when the lite server needs to use a local capability, such as a dedicated channel, locating, and storage, after charging is performed, a unit calls the API to provide a service. If the lite server uses a capability in the core network, the access network unit communicates with a capability interface of a core network unit, and calls, after a charging module becomes effective, a capability in a local capability pool to provide a service to the lite server.

Process 2: A local lite server cannot provide a complete service due to a limited functional logic. In this case, it is required to send a request to a server in a VM in an Internet unit. After calling a capability API in the Internet, the server returns a service result to the lite server, and finally, the lite server serves the VUE.

Three functional units of the cloud platform in this embodiment are deployed in a base station, a core network, and the Internet respectively, can integrate various capabilities in a telecommunications network of an operator, and have all advantages of an existing PaaS platform. This can provide an advantage of one-click distribution of APP to the operator, to change an existing network user to a user served by an application.

Technically, the cloud platform relies on the VUE and the lite server that are provided by a mobile virtualization technology configured for the access network unit, to maximize use of a network capability of the operator to make an ASP provide a higher quality service to a user while avoiding bringing unnecessary burden to a network of the operator. A capability engine on the access network unit provides a telecommunications capability that the access network unit has to an application program on the platform, and uses a location characteristic of a network edge to reduce a round-trip time (RTT) and core network traffic, so as to maximize use of a locating capability and increase profit margins.

For an ASP, especially for a small- and medium-sized ASP, the present disclosure provides a full set of development, testing, simulation, and deployment environments, greatly reducing APP deployment costs of an ASP, improving development efficiency, and enriching APP functions.

Figure 9:
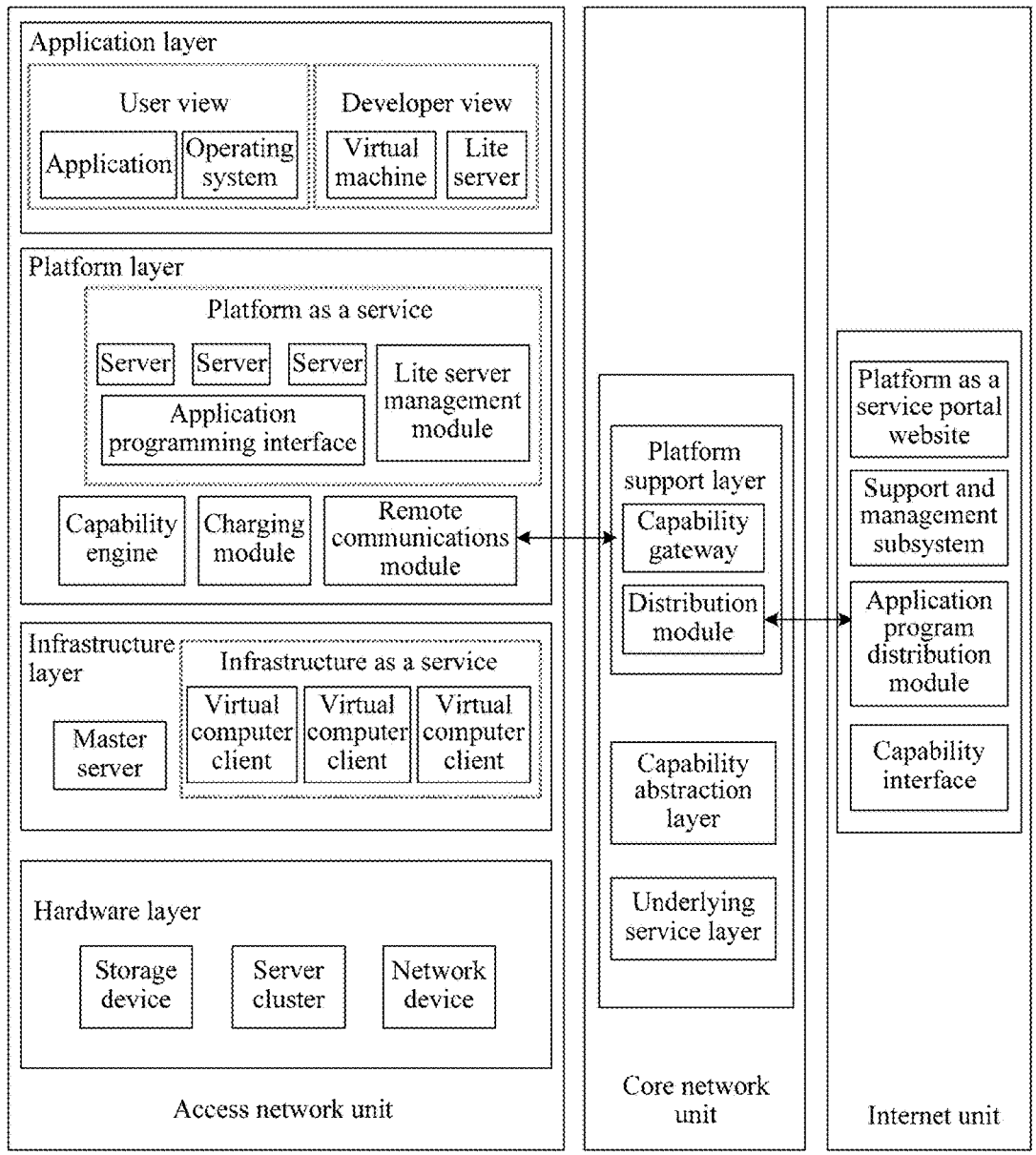
FIG. 9 is a schematic diagram of a second specific architecture of the cloud platform shown in FIG. 1.

Referring to FIG. 9, FIG. 9 is a schematic diagram of a second specific architecture of the cloud platform shown in FIG. 1. In this embodiment, the cloud platform includes an Internet unit, a core network unit, and an access network unit. The access network unit may be disposed in a base station. The access network unit is a core unit that achieves many beneficial effects of the cloud platform in this embodiment. The Internet unit is an entrance at which an administrator and an ASP directly interact with the platform. The core network unit is located between the access network unit and the Internet unit, and plays a role of intermediary and implements more comprehensive function support. Compared with the Internet unit shown in FIG. 4, the Internet unit in this embodiment retains only two main functional modules: a PaaS portal and an App distributor, and an interface that interacts with an external Internet application program of the cloud platform.

The entire Internet unit is represented as a cloud computing product of an SaaS service model externally, and does not provide a public development and running environment or a unified platform.

The ASP may distribute, via a core network unit by using an App distributor module, a lite server developed by the ASP to the access network unit and deploy the lite server in the access network unit, and the Internet unit no longer provides a virtualized environment for deployment of a server. Communication between the lite server and the server is provided by a capability interface. An Internet capability required by the PaaS portal and a support and management subsystem is also provided by the capability interface. The remaining core network unit and access network unit are the same as those of the cloud platform shown in FIG. 4. A temporal logic at stages of the cloud platform in this embodiment is described in detail in the following with reference to FIG. 13 to FIG. 15.

Figure 10:
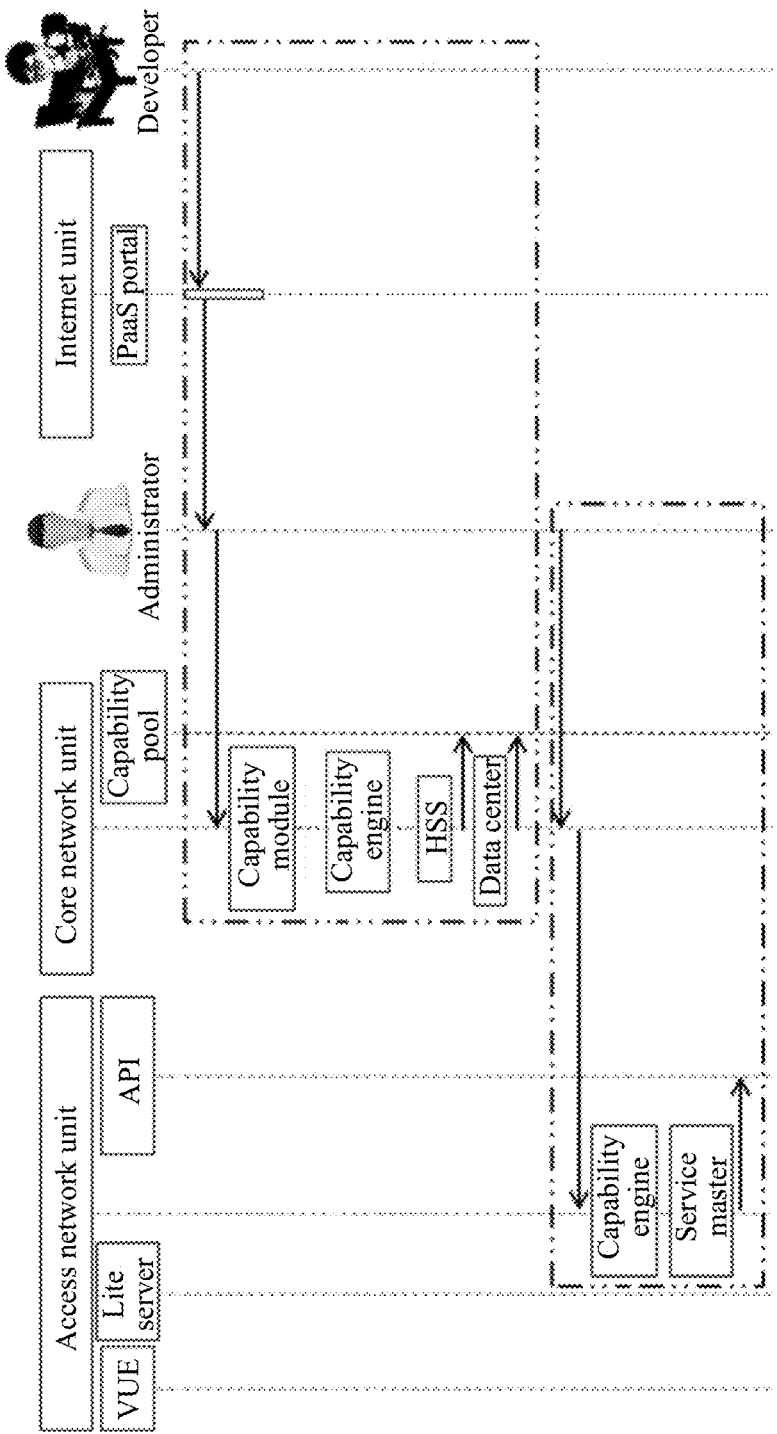
FIG. 10 is a temporal logic diagram of a capability development stage of the cloud platform shown in FIG. 9.

Referring to FIG. 10, FIG. 10 is a temporal logic diagram of a capability development stage of the cloud platform shown in FIG. 9. In this embodiment, There are two processes in the capability development stage. First, a developer proactively initiates capability development. In this part, because a function of the Internet unit is simplified, only after the developer first puts forward a new capability requirement, an administrator manages a core network capability. Details thereof are the same as those of process 1 in the embodiment of FIG. 6.

A process in which the administrator proactively initiates capability development is the same as process 2 in the first embodiment.

Figure 11:
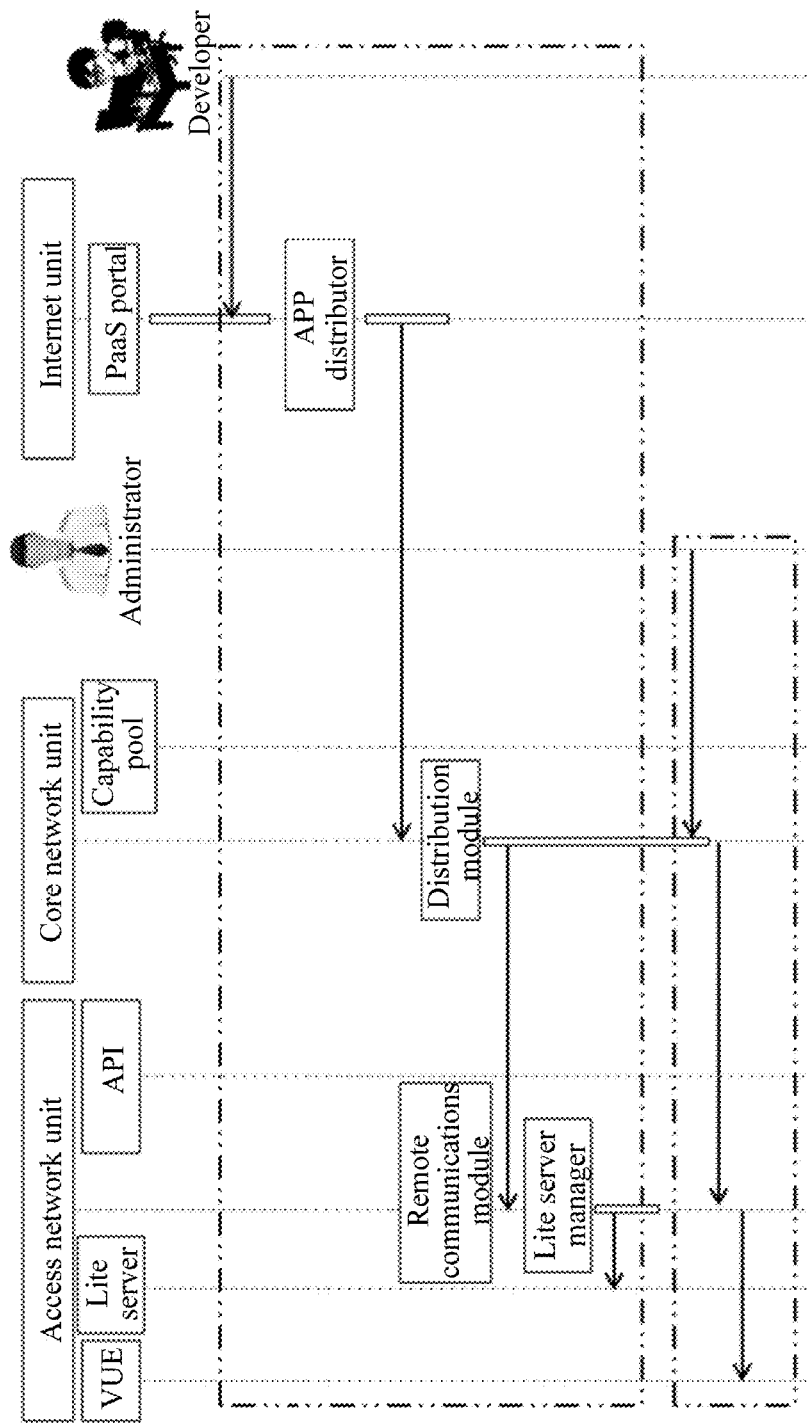
FIG. 11 is a temporal logic diagram of application program development/deployment of the cloud platform shown in FIG. 9.

Referring to FIG. 11, FIG. 11 is a temporal logic diagram of application program development/deployment of the cloud platform shown in FIG. 9. In this embodiment, there are two processes at this stage. First, a developer proactively initiates deployment of a lite server. A difference from the embodiment of FIG. 7 lies in that: in the embodiment of FIG. 7, there are an entire process of developing an APP, an APP server, and a lite server and a deployment process thereof, whereas in this embodiment, there are only a deployment and distribution process of an APP and a lite server.

For details, reference may be made to process 2 in the embodiment of FIG. 7.

Figure 12:
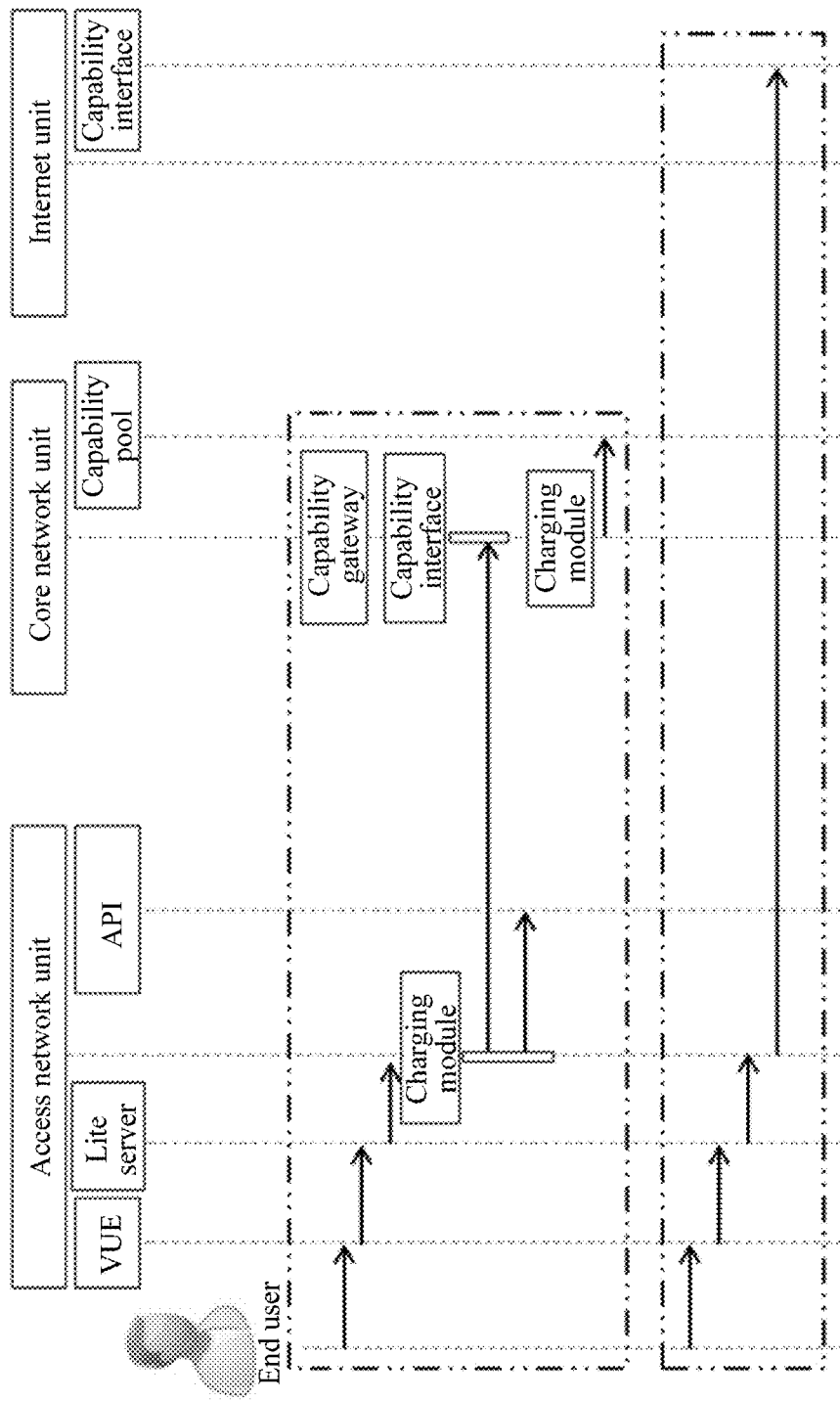
FIG. 12 is a temporal logic diagram for use of the cloud platform shown in FIG. 9.

Referring to FIG. 12, FIG. 12 is a temporal logic diagram for use of the cloud platform shown in FIG. 9. In this embodiment, there are two processes at this stage. Process 1 is the same as process 1 in the first embodiment shown in FIG. 8.

In process 2, a local lite server cannot provide a complete service due to a limited functional logic. In this case, it is required to send a request to a server. After establishing a connection to the Internet unit and after accessing a server of the application program by using a capability interface, the access network unit returns a service result to the lite server, so as to finally serve the VUE.

Three functional units of the cloud platform in this embodiment are deployed in a base station, a core network, and the Internet respectively, can integrate various capabilities in a telecommunications network of an operator, and have all advantages of an existing PaaS platform. This can provide an advantage of one-click distribution of APP to the operator, to change an existing network user to a user served by an application.

Technically, the cloud platform relies on the VUE and the lite server that are provided by a mobile virtualization technology configured for the access network unit, to maximize use of a network capability of the operator to make an ASP provide a higher quality service to a user while avoiding bringing unnecessary burden to a network of the operator. A capability engine on the access network unit provides a telecommunications capability that the access network unit has to an application program on the platform, and uses a location characteristic of a network edge to reduce an RTT and core network traffic, so as to maximize use of a locating capability and increase profit margins.

Figure 13:
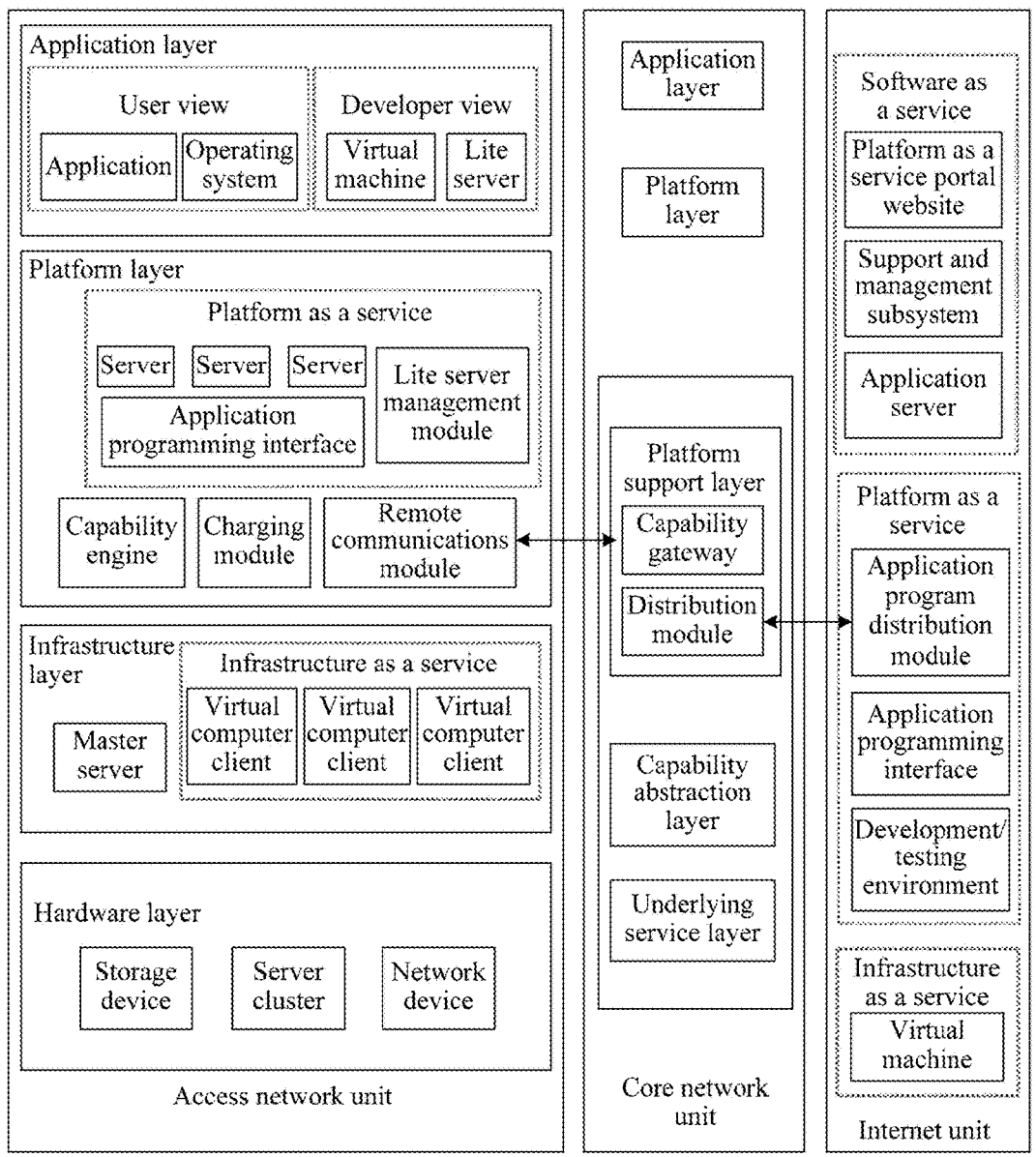
FIG. 13 is a schematic diagram of a third specific architecture of the cloud platform shown in FIG. 1.

Referring to FIG. 13, FIG. 13 is a schematic diagram of a third specific architecture of the cloud platform shown in FIG. 1. In this embodiment, the cloud platform includes an Internet unit, a core network unit, and an access network unit. The access network unit may be disposed in a base station.

The access network unit is a core unit that achieves many beneficial effects of the cloud platform. The Internet unit is an entrance at which an administrator and an ASP directly interact with the platform. The core network unit is located between the access network unit and the Internet unit, and plays a role of intermediary and implements more comprehensive function support. This is described in the following in detail with reference to FIG. 17 to FIG. 19.

Figure 14:
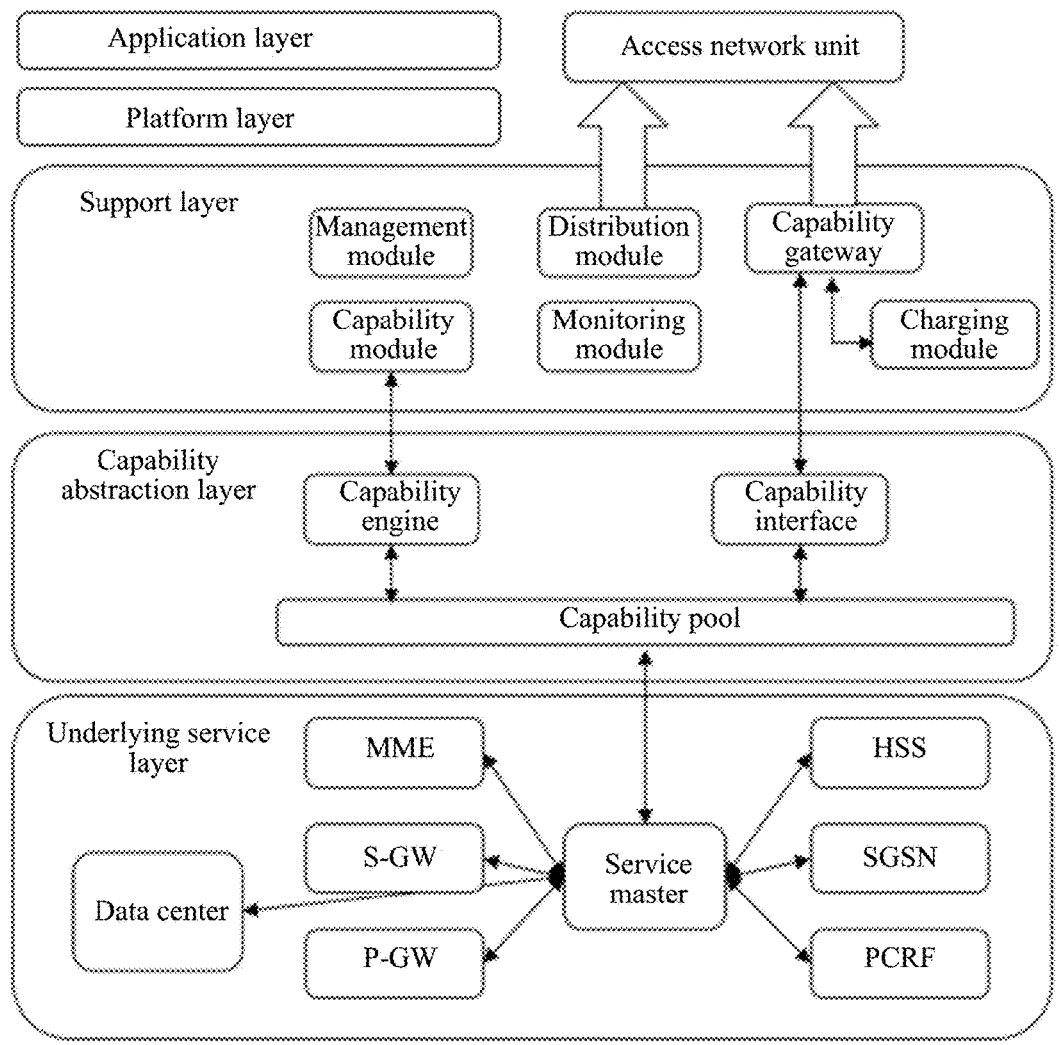
FIG. 14 is a schematic diagram of a specific architecture of a core network unit of the cloud platform shown in FIG. 13.

Referring to FIG. 14, FIG. 14 is a schematic diagram of a specific architecture of a core network unit in the cloud platform shown in FIG. 13. In this embodiment, the core network unit of the cloud platform is divided, from top to bottom, into five logical layers: an application layer, a platform layer, a support layer, a capability abstraction layer, and a service layer.

The application layer and the platform layer at the top transplant corresponding layers in an access network unit to the core network unit, and are applicable to an early deployment stage of the cloud platform. Details about a specific structure and a function thereof are the same as related descriptions about the access network unit in the first embodiment.

In an initial stage of using the cloud platform, a quantity of users is relatively small, and a demand for deploying the lite server at a lower layer is not quite strong temporarily. In this case, a virtualized environment that is the same as that of the access network unit is added in the core network unit, and a tool and an environment provided for deployment of the VUE and the lite server are disposed in the virtualized environment, so that the core network unit can temporarily play a role of an access network unit, and temporarily provide a corresponding beneficial effect.

The support layer, the capability abstraction layer, and the underlying service layer are the same as those described in the embodiment of FIG. 4.

Figure 15:
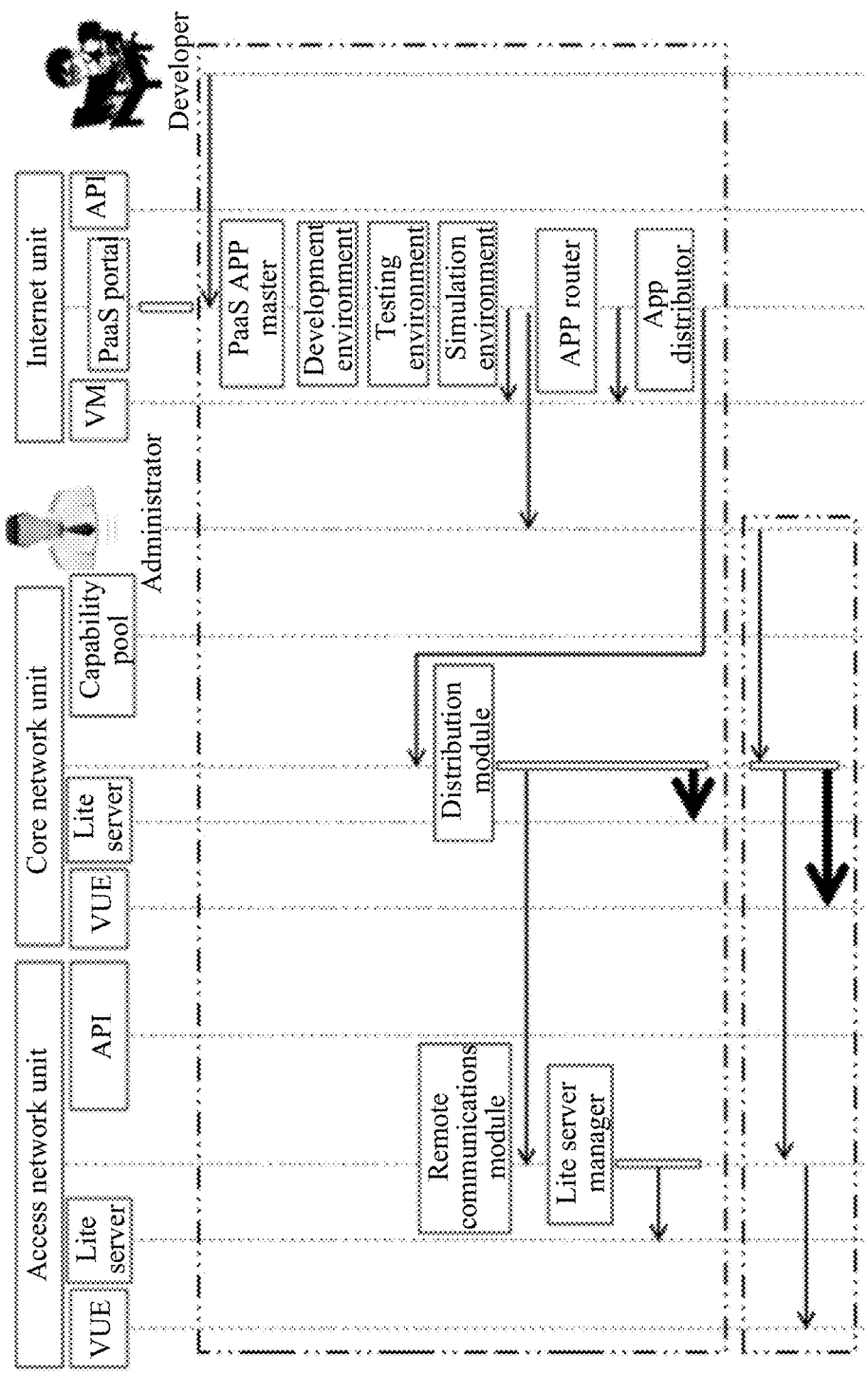
FIG. 15 is a temporal logic diagram of application program development/deployment of the cloud platform shown in FIG. 13.

Referring to FIG. 15, FIG. 15 is a temporal logic diagram of application program development/deployment of the cloud platform shown in FIG. 13. In this embodiment, because a virtualized environment in the core network unit is provided in this embodiment, an APP may be deployed in the access network unit or the core network unit.

When the APP is deployed in the access network unit, a temporal logic is the same as that of the embodiment shown in FIG. 7.

Figure 18:
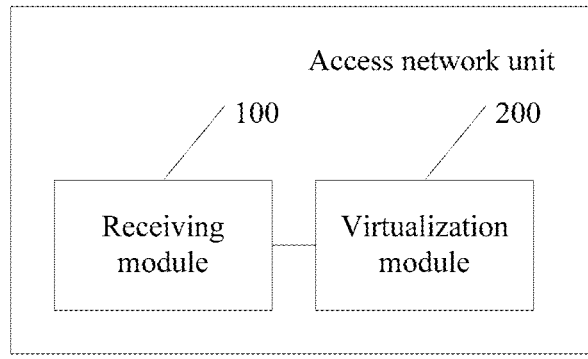
FIG. 18 is a schematic composition diagram of a first embodiment of an access network unit according to the present disclosure.

When the APP is deployed in the core network unit, as shown in FIG. 18, two relatively bold arrows indicate procedures in which a distribution module deploys the APP in the virtualized environment of the core network unit in an APP deployment process initiated by a developer proactively and an APP deployment process initiated by an administrator proactively, respectively.

Figure 16:
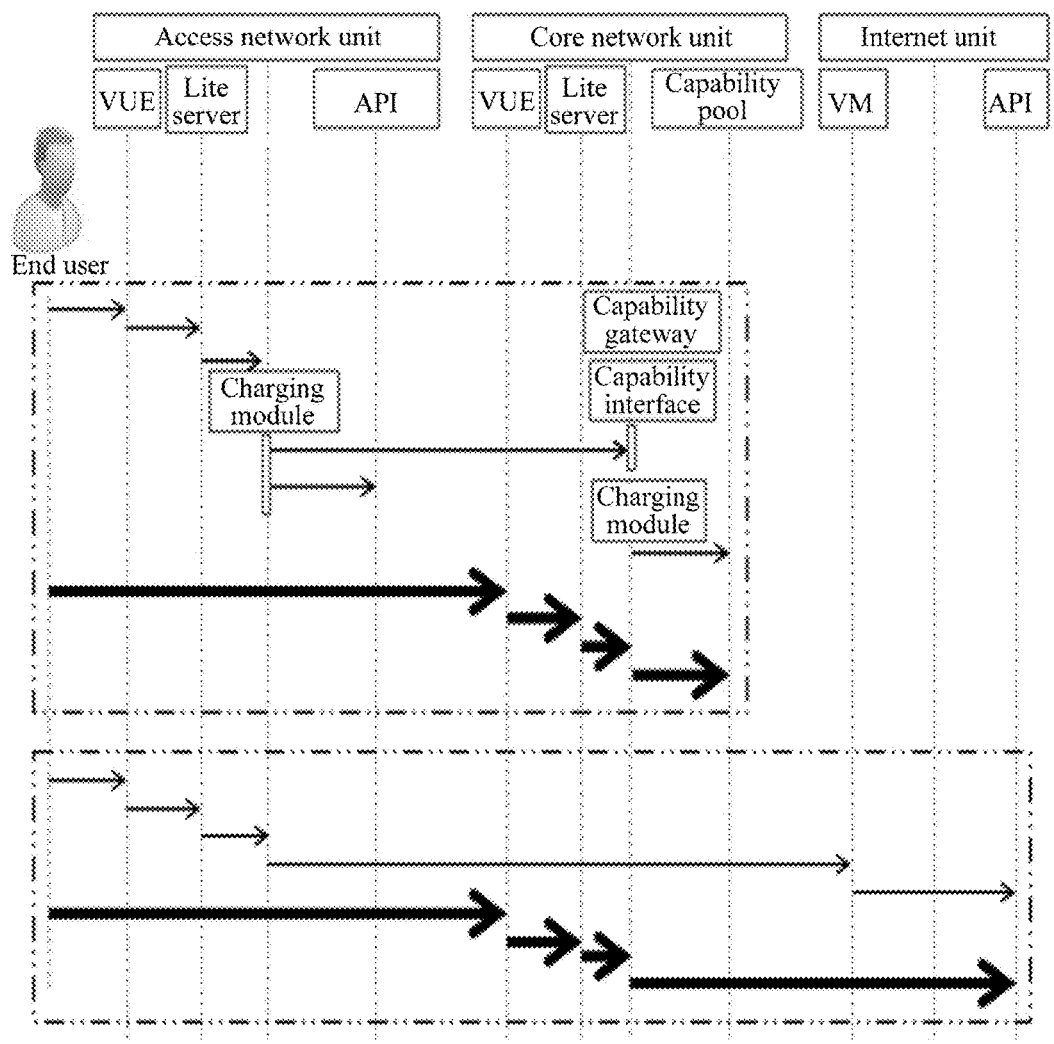
FIG. 16 is a temporal logic diagram for use of the cloud platform shown in FIG. 13.

Referring to FIG. 16, FIG. 16 is a temporal logic diagram for use of the cloud platform shown in FIG. 13. In this embodiment, because a virtualized environment is provided in a core network unit in this embodiment, the VUE may accept a service from a lite server in an access network unit or the core network unit. The former is the same as that in the embodiment shown in FIG. 8.

The latter is shown in FIG. 16, two groups of relatively bold arrows are procedures in which a virtual machine in the core network unit participates, in a process in which the lite server provides a service and a process in which a server provides a service, respectively.

In this embodiment, a virtualization technology is added to the core network unit, and the virtualization technology is specifically embodied as a platform layer and an application layer on the unit. A technical effect brought thereby is making full use of a network capability of an operator, so that an ASP can provide a user with a higher quality service while avoiding bringing unnecessary burden to a network of the operator.

Figure 17:
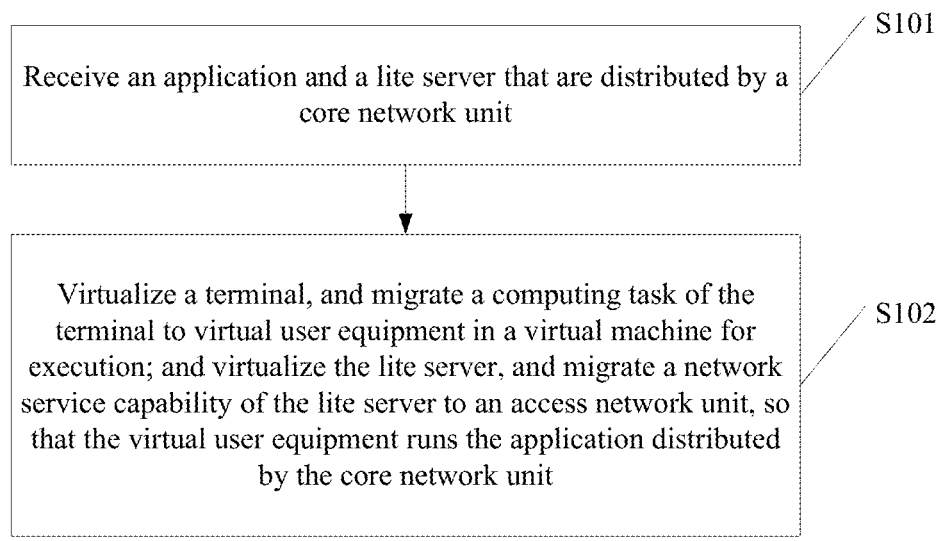
FIG. 17 is a schematic flowchart of an application running method according to an embodiment of the present disclosure.

Referring to FIG. 17, FIG. 17 is a schematic flowchart of an application running method according to an embodiment of the present disclosure. In this embodiment, the method includes the following steps:

S101. Receive an application and a lite server that are distributed by a core network unit.

The application and the lite server are developed by an Internet unit and distributed by the Internet unit to the core network unit.

S102. Virtualize a terminal, and migrate a computing task of the terminal to virtual user equipment in a virtual machine for execution; and virtualize the lite server, and migrate a network service capability of the lite server to an access network unit, so that the virtual user equipment runs the application distributed by the core network unit.

Referring to FIG. 18, FIG. 18 is a schematic composition diagram of a first embodiment of an access network unit according to the present disclosure. In this embodiment, the access network unit includes:

a receiving module 100, configured to receive an application and a lite server that are distributed by a core network unit, where the application and the lite server are developed by an Internet unit and distributed by the Internet unit to the core network unit; and a virtualization module 200, configured to virtualize a terminal, and migrate a computing task of the terminal to virtual user equipment in a virtual machine for execution; and virtualize the lite server, and migrate a network service capability of the lite server to the access network unit, so that the virtual user equipment runs the application distributed by the core network unit.

Optionally, if the lite server located in the access network unit has a capability of serving the virtual user equipment, when a user uses the terminal, the virtualization module 200 is further configured to connect the terminal to the virtual user equipment, send a request to the lite server according to a requirement of the terminal, and call, by using a local capability, a local application programming interface to provide a service; or communicate with the core network unit, and call a capability in a capability pool of the core network unit to serve the lite server to meet a requirement of the terminal; or if the lite server located in the access network unit does not have a capability of serving the virtual user equipment, the virtualization module 200 is further configured to send a request to a virtual machine server in the Internet unit by using the core network unit, and receive a service result by using the lite server to meet a requirement of the terminal, where the service result is returned by the virtual machine server after the virtual machine server calls a capability application programming interface of the Internet unit.

Figure 19:
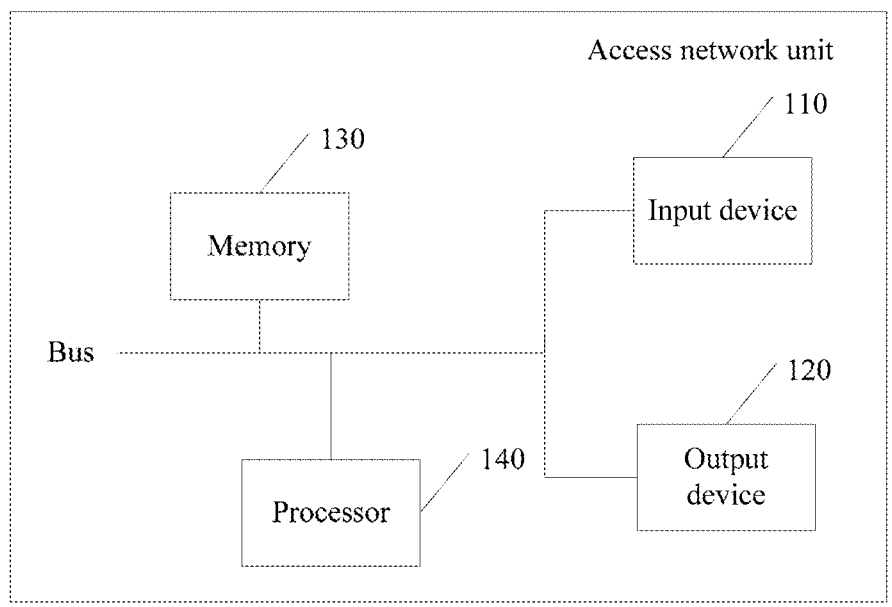
FIG. 19 is a schematic composition diagram of a second embodiment of an access network unit according to the present disclosure.

Referring to FIG. 19, FIG. 19 is a schematic composition diagram of a second embodiment of an access network unit according to the present disclosure. In this embodiment, the access network unit includes:

an input device 110, an output device 120, a memory 130, and a processor 140, where the input device 110, the output device 120, the memory 130, and the processor 140 are connected to a bus, the memory 130 stores a set of program code, and the processor 140 is configured to call the program code stored in the memory 130 to execute the following operations:

receiving an application and a lite server that are distributed by a core network unit, where the application and the lite server are developed by an Internet unit and distributed by the Internet unit to the core network unit; and virtualizing a terminal, and migrating a computing task of the terminal to virtual user equipment in a virtual machine for execution; and virtualizing the lite server, and migrating a network service capability of the lite server to the access network unit, so that the virtual user equipment runs the application distributed by the core network unit.

Optionally, if the lite server located in the access network unit has a capability of serving the virtual user equipment, when a user uses the terminal, the processor 140 is further configured to connect the terminal to the virtual user equipment, send a request to the lite server according to a requirement of the terminal, and call, by using a local capability, a local application programming interface to provide a service; or communicate with the core network unit, and call a capability in a capability pool of the core network unit to serve the lite server to meet a requirement of the terminal; or if the lite server located in the access network unit does not have a capability of serving the virtual user equipment, the processor 140 is further configured to send a request to a virtual machine server in the Internet unit by using the core network unit, and receive a service result by using the lite server to meet a requirement of the terminal, where the service result is returned by the virtual machine server after the virtual machine server calls a capability application programming interface of the Internet unit.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly; for related parts, reference may be made to partial descriptions in the method embodiment.

According to descriptions of the foregoing embodiments, the present disclosure has the following advantages:

A mobile virtualization technology is configured for an access network unit, so that the access network unit can provide VUE and a lite server to maximize use of a network capability of an operator, making an ASP provide a user with a higher quality service while avoiding bringing unnecessary burden to a network of the operator. In addition, cloud product development costs of the operator can be reduced, user experience can be improved, a service promotion effect of the operator can be enhanced. A capability engine on the access network unit provides a telecommunications capability that the access network unit has to an application program on a platform, and uses a location characteristic of a network edge to reduce a round-trip time and core network traffic, so as to maximize use of a locating capability and increase profit margins.

A person of ordinary skill in the art may understand that: All or apart of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The cloud platform, the application running method, and the access network unit provided in the embodiments of the present disclosure are described in detail in the foregoing. In this specification, specific examples are used to describe the principle and implementations of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A cloud platform, comprising:
   a receiver, configured to receive an application and a lite server that are developed by an application service provider; and
   a transmitter, configured to distribute the application and the lite server to a processor, wherein the processor is configured to:
     virtualize a terminal, and migrate a computing task of the terminal to virtual user equipment in a virtual machine for execution, and
     virtualize the lite server, and migrate a network service capability of the lite server to the processor.

2. The cloud platform according to claim 1, wherein:
   the receiver is further configured to receive capability requirement information of a developer; and
   the processor is further configured to perform capability extraction and encapsulation on a network element corresponding to the capability requirement information, for calling by the application.

3. The cloud platform according to claim 1, wherein:
   the receiver is further configured to receive capability requirement information of a developer; and
   the processor is configured to develop a capability of the receiver, and store a new capability in an application programming interface set of an Internet unit, for local or remote calling by the application.

4. The cloud platform according to claim 1, wherein the processor is further configured to:
   remotely control a capability engine according to an instruction of an administrator;
   add or modify software and hardware capabilities; and
   add the added or modified software and hardware capabilities to an application programming interface of the processor, for calling by the virtual user equipment or the lite server.

5. The cloud platform according to claim 1, wherein the processor is further configured to test and deploy a developed application and application server.

6. The cloud platform according to claim 5, wherein:
   the receiver is further configured to receive the developed application program; and
   the processor is further configured to distribute the lite server corresponding to the application and deploy the lite server in a local virtualized environment to provide a service to the virtual user equipment.

7. The cloud platform according to claim 6, wherein when the lite server located in the processor has a capability of serving the virtual user equipment, when a user uses the terminal, the processor is configured to:
   connect the terminal to the virtual user equipment, send a request to the lite server according to a requirement of the terminal, and call, by using a local capability, a local application programming interface to provide a service; or communicate with the processor, and call a capability in a capability pool to serve the lite server to meet the requirement of the terminal; or
   if the lite server located in the processor does not have a capability of serving the virtual user equipment, the transmitter is configured to send a request to a virtual machine server, and the receiver is configured to receive a service result by using the lite server to meet a requirement of the terminal, wherein the service result is returned by the virtual machine server after the virtual machine server calls a capability application programming interface.

8. The cloud platform according to claim 5, wherein:
   the receiver is further configured to receive a distribution instruction sent by an administrator; and
   the transmitter is configured to distribute an installation package of the application to a virtualized environment and install the application to the virtual user equipment.

9. The cloud platform according to claim 1, wherein the processor is further configured to virtualize the terminal and the lite server.

10. An application running method, comprising:
    receiving an application and a lite server that are distributed by a core network unit, wherein the application and the lite server are developed by an Internet unit and distributed by the Internet unit to the core network unit;
    virtualizing a terminal, and migrating a computing task of the terminal to virtual user equipment in a virtual machine for execution; and
    virtualizing the lite server, and migrating a network service capability of the lite server to an access network unit, so that the virtual user equipment runs the application distributed by the core network unit.

11. The method according to claim 10, further comprising:
    when the lite server located in the access network unit has a capability of serving the virtual user equipment, when a user uses the terminal, connecting, by the access network unit, the terminal to the virtual user equipment; sending a request to the lite server according to a requirement of the terminal, and calling, by using a local capability, a local application programming interface to provide a service; or communicating with the core network unit, and calling a capability in a capability pool of the core network unit to serve the lite server to meet the requirement of the terminal; or when the lite server located in the access network unit does not have a capability of serving the virtual user equipment, the access network unit sends a request to a virtual machine server in the Internet unit by using the core network unit, and receives a service result by using the lite server to meet a requirement of the terminal, wherein the service result is returned by the virtual machine server after the virtual machine server calls a capability application programming interface of the Internet unit.

12. An access network unit, comprising:
a receiver, configured to receive an application and a lite server that are distributed by a core network unit, wherein the application and the lite server are developed by an Internet unit and distributed by the Internet unit to the core network unit; and
a processor, configured to:
  virtualize a terminal, and migrate a computing task of the terminal to virtual user equipment in a virtual machine for execution, and
  virtualize the lite server, and migrate a network service capability of the lite server to the access network unit, so that the virtual user equipment runs the application distributed by the core network unit.

13. The access network unit according to claim 12, comprising:
when the lite server located in the access network unit has a capability of serving the virtual user equipment, when a user uses the terminal, the processor is further configured to connect the terminal to the virtual user equipment, send a request to the lite server according to a requirement of the terminal, and call, by using a local capability, a local application programming interface to provide a service; or communicate with the core network unit, and call a capability in a capability pool of the core network unit to serve the lite server to meet a requirement of the terminal; or
when the lite server located in the access network unit does not have a capability of serving the virtual user equipment, the processor is further configured to send a request to a virtual machine server in the Internet unit by using the core network unit, and receive a service result by using the lite server to meet a requirement of the terminal, wherein the service result is returned by the virtual machine server after the virtual machine server calls a capability application programming interface of the Internet unit.

14. An access network unit, comprising:
an input device, an output device, a memory, and a processor, wherein the input device, the output device, the memory and the processor are connected to a bus, and wherein the memory stores program code which, when executed by the processor, causes the access network unit to:
  receive an application and a lite server that are distributed by a core network unit, wherein the application and the lite server are developed by an Internet unit and distributed by the Internet unit to the core network unit;
  virtualize a terminal, and migrate a computing task of the terminal to virtual user equipment in a virtual machine for execution; and
  virtualize the lite server, and migrate a network service capability of the lite server to the access network unit, so that the virtual user equipment runs the application distributed by the core network unit.

15. The access network unit according to claim 14, wherein:
when the lite server located in the access network unit has a capability of serving the virtual user equipment, when a user uses the terminal, the program code, when executed by the processor, further causes the access network unit to: connect the terminal to the virtual user equipment, send a request to the lite server according to a requirement of the terminal, and call, by using a local capability, a local application programming interface to provide a service; or communicate with the core network unit, and call a capability in a capability pool of the core network unit to serve the lite server to meet the requirement of the terminal; or
when the lite server located in the access network unit does not have a capability of serving the virtual user equipment, the program code, when executed by the processor, further causes the access network unit to: send a request to a virtual machine server in the Internet unit by using the core network unit, and receive a service result by using the lite server to meet a requirement of the terminal, wherein the service result is returned by the virtual machine server after the virtual machine server calls a capability application programming interface of the Internet unit.

* * * * *